United States Patent [19]
Gaechter et al.

[11] 4,145,021
[45] Mar. 20, 1979

[54] ALTAZIMUTH ORIENTATION SUPPORT

[75] Inventors: Jean-Pierre Gaechter; Charles Bourdeau, both of Castanet-Tolosan; Guy Vialaret, Toulouse, all of France

[73] Assignee: Agence Nationale de Valorisation de la Recherche (ANVAR), Neuilly-sur-Seine, France

[21] Appl. No.: 822,818

[22] Filed: Aug. 8, 1977

[30] Foreign Application Priority Data

Aug. 11, 1976 [FR] France .............................. 76 25026

[51] Int. Cl.$^2$ ........................................... A45D 19/04
[52] U.S. Cl. .................................. 248/371; 248/455; 126/270
[58] Field of Search ............... 248/371, 278, 454, 455, 248/457, 458; 126/270, 271; 343/882, 765, 766

[56] References Cited
U.S. PATENT DOCUMENTS

| | | | |
|---|---|---|---|
| 820,127 | 5/1906 | Pope | 126/271 |
| 1,951,404 | 3/1934 | Goddard | 126/270 |
| 2,182,222 | 12/1939 | Courts et al. | 126/270 |
| 2,770,229 | 11/1956 | Tarcici | 126/270 H |
| 3,787,870 | 1/1974 | Rocci | 343/765 |

*Primary Examiner*—Robert A. Hafer
*Attorney, Agent, or Firm*—Shlesinger, Arkwright, Garvey & Dinsmore

[57] ABSTRACT

An altazimuth orientation support for a panel for adjusting the panel in elevation and in azimuth including a vertical pivot and support therefore enabling rotation of the panel around a vertical axis, a mounting integral with the pivot for carrying the panel and enabling pivotal adjustment of the panel about a horizontal axis, a framework extending rearwardly from the panel to a circular trackway and means for driving the framework along the trackway for azimuth orientation, and means associated with the framework for adjusting the panel about the horizontal axis.

12 Claims, 8 Drawing Figures

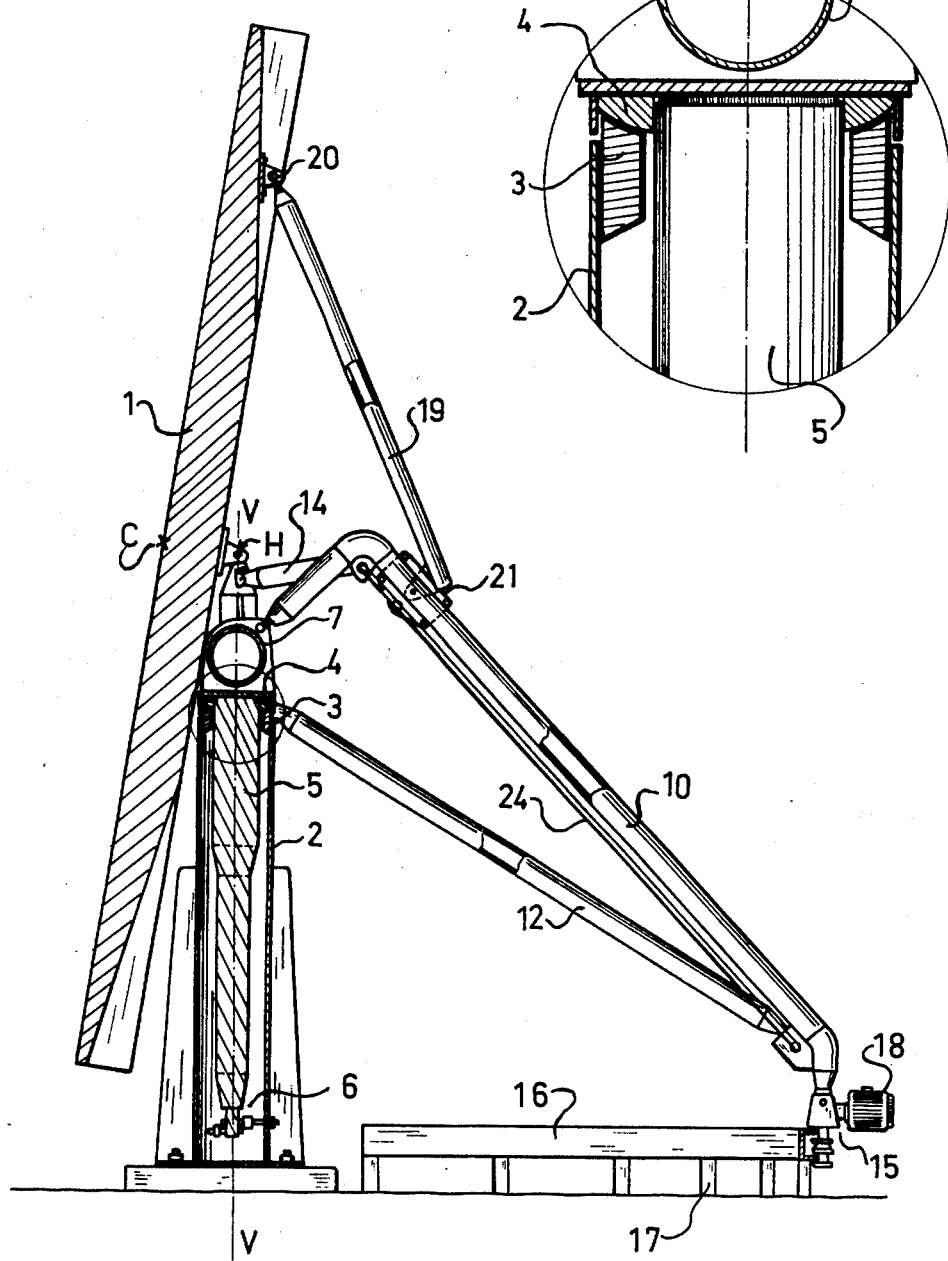
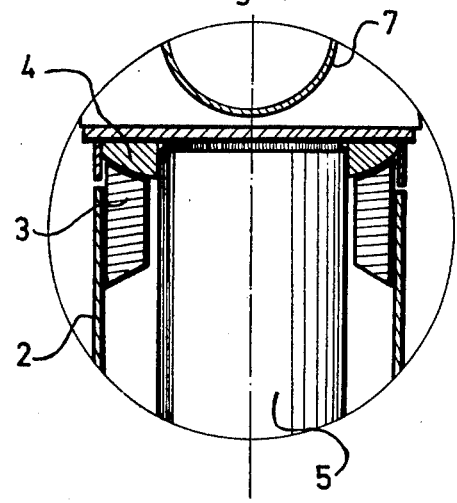

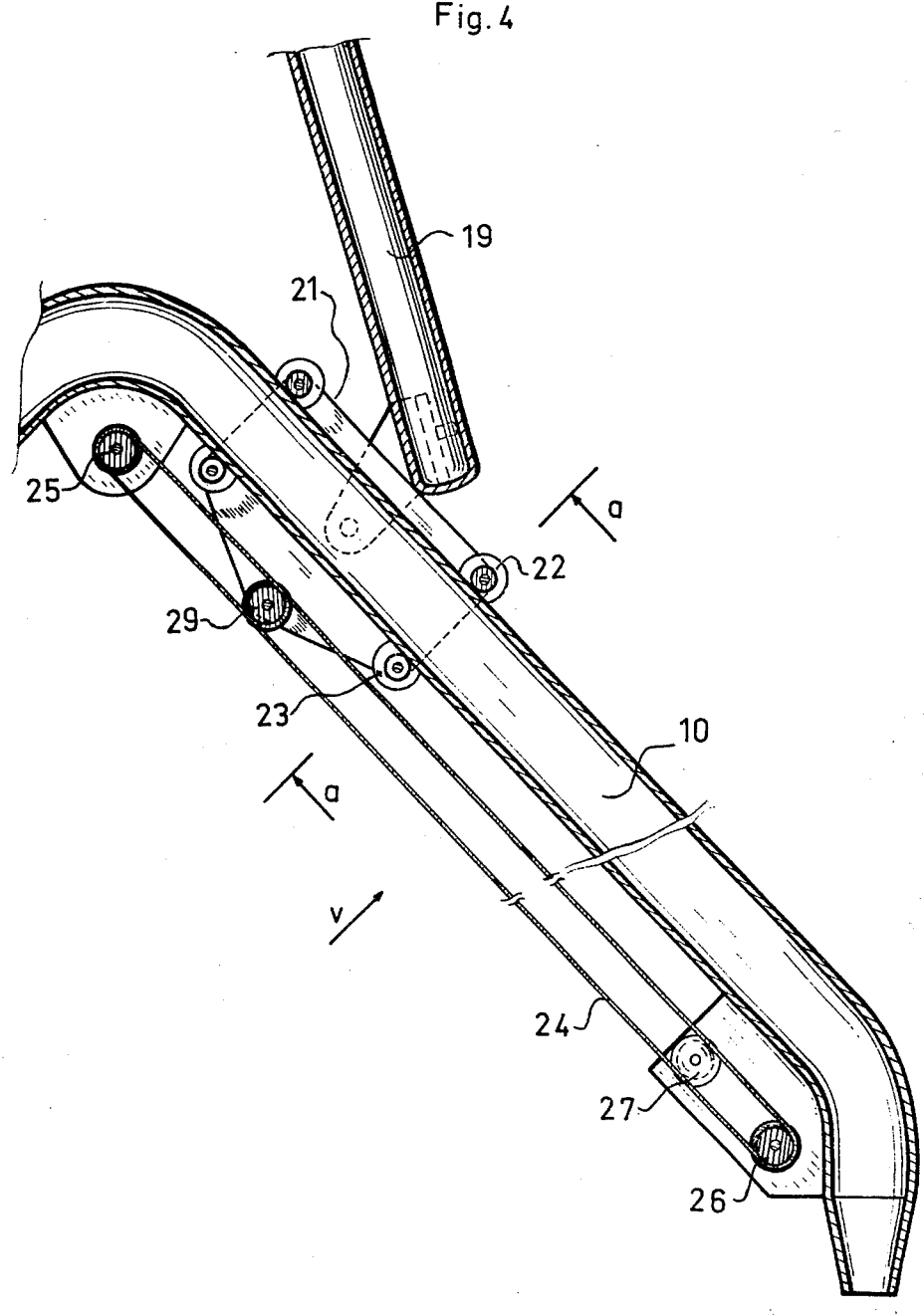

ALTAZIMUTH ORIENTATION SUPPORT

The invention concerns an altazimuth orientation support for orientation of a panel in elevation and in azimuth. This support can particularly but not exclusively be a heliostat support to properly orient a reflecting panel of flat or parabolic form, in order to direct the solar rays toward an objective to be radiated or heated, such as photochemical, heat, etc., cells.

The present heliostat supports can be classified in three categories. Some possess a central pivot which supports the panel to be oriented and a central control system arranged at the head of this pivot to assure the movements of the panel in elevation and in azimuth. This control system frequently comprises an endless screw and rack drive. This type of support is suitable for small panels but cannot be applied in practice when the panel exceeds surface dimensions on the order of 20 to 30 m$^2$, because its central control system is not rigid and cannot be adapted to support great forces, of the type transmitted by large surface panels (forces due to wind, weight, etc...). These supports can be improved by providing their control system with a planet reduction gear without play and with high torque. However, the cost of the unit then becomes very high, while the power necessary for its control also become very high.

In another type of heliostat, the panel is divided into several small panels which are individually supported; these panels are coupled together by a mechanical system (rod linkage system or the like) which generates their movement and orients them in elevation and in azimuth. This mechanical system is complex and very cumbersome and does not allow high precision regulation; besides, the number of panels which can be controlled with such a system is limited in practice. Also, there is the problem of the shadow of one panel shading the other, which limits the possible orientation of the panels and does not permit reflection of the grazing incidence beams.

Also, another type of heliostat exists, in which the support comprises a horizontal triangular base, intended to be displaced on a circular rail for the azimuth angle regulation. The panel is supported by this horizontal base and can be pivoted vertically around one side of the base to effect the regulation of the angle of elevation. In this type of heliostat, the rail supports the total weight of the panel and of the structure. The precision of its form and of its position according to the 3 axes of the space is determinant to attain good precision in the regulations of the orientation of the panel; these characteristics require that this rail be very rigid, be realized with very low tolerances, and that its setting be executed very carefully on the chosen site. Moreover, whatever be the precautions taken, even a slight modification of the state of the terrain (sinking or other) is prejudicial to the precision. It should also be noted that in this type of heliostat the center of the panel is greatly displaced in the course of the rotation cycle. Under these conditions it is difficult to control the movements of the panel in closed loop, because the ray reflected by the center of the panel, which each instant gives the mean orientation of the reflected beam, cannot be used as reference to detect the variations of orientation of the incident beam and simply to deduce from it in corrections to be effected. Moreover, it is difficult to find another reflected ray adapted to constitute such a reference. This type of heliostat is thus of necessity controlled in open loop in relation to the absolute spatial references, and presents the known faults of this type of control.

The present invention proposes a remedy to the aforementioned faults of known orientation supports.

One object of the invention is particularly to furnish an orientation support which is beneficial and has the following features: the capacity to furnish high precision regulation, the capacity to support large dimension panels, and reduced cost.

Another object of the invention is to furnish a support which can be controlled in closed loop. For this, the altazimuth orientation support according to the invention, intended to orient a panel, particularly a heliostat panel, in elevation and in azimuth, comprises an essentially vertical pivot, a stationary central column provided with support means for said pivot adapted to guide it in rotation around a vertical axis V, a mounting which is integral with the pivot and carries the panel by means of articulation means which are adapted to give it the faculty to pivot around a horizontal axis H, a framework provided for maneuvering in azimuth, extending toward the rear of the panel and rigidly controlled on the aforementioned mounting to define the orientation of the panel around the vertical axis V, guide means of the rear end of the framework on a circular trajectory centered on the vertical axis V, drive means for this end along this trajectory, an elevation maneuvering framework, articulated on the panel to there define the panel orientation around the horizontal axis H, and provided at its opposite end with a movable foot adapted to be able to displaced along the framework for maneuvering in azimuth, and finally drive means to drive this movable foot along the framework for maneuvering in azimuth.

Thus the assembly of the panel and of the mounting which carries it is supported by the vertical pivot supported by the central column. The framework for maneuvering in azimuth exerts on the guide means only tangential forces which permit definition of its position in azimuth, and it is not necessary that these means be adapted to support high constraints. These guide means can comprise a circular stationary rail centered on the vertical axis V and rolling means carried by the rear end of the framework and guided by the rail. The movements of the panel are effected around vertical axis V and around horizontal axis H, which are defined on the one hand by the column and its pivot, and on the other hand by the mounting and its articulation means; the circular rail does not impose its own design at the time of execution of these movements, and its form and its position need not be very precise according to all of the axes of the space. It can however serve as advantageous support for an absolute coder in azimuth.

Preferably, the support means with the column, and the articulation of the panel on the mounting, are adapted such that the vertical axis V, defined by these support means, and the horizontal axis H, defined by this articulation, are coplanar, and the secant area of these axes is in proximity with the center of the panel. This panel is thus balanced relative to the pivot, which supports it, and its center is displaced only slightly on a small radius sphere centered at the intersection of axes H and V. In application to heliostats or analogous applications, it is possible to position a sighting element which is intended to receive the reflected rays issuing from the central zone of the panel, in order to control the movements of the panel in closed loop.

According to a preferred embodiment, the framework for maneuvering in azimuth is formed by a rigid structure, particularly tubular, in tetrahedral form, provided with a long element extending toward the rear in the axial plane of the panel; the movable foot of the framework for maneuvering in elevation is connected to this long element in order to be displaced along it. This framework for maneuvering in elevation can be very simply constituted of a bearing, particularly tubular, situated in the axial plane of the panel. The movable foot preferably includes means for rolling, guided by the framework for maneuvering in azimuth.

Besides, the rolling means at the rear end of the framework for maneuvering in azimuth are preferably connected to it by a connection system which is adapted to give said rolling means a freedom of movement relative to the framework, in the plane perpendicular to the rail, and to rigidly connect said framework and said rolling means along the direction tangential to the rail. Thus, except for the forces of friction, no force is exerted on the circular rail in the radial plane and its small imperfections are translated by local variations of the radius of the curve or the height and are not prejudicial to the precision to be attained in orientation of the panel. The rail can be implanted on site without difficulty, and small differentials of the terrain, which can locally modify its height, are of no concern.

Other characteristics, objects and advantages of the invention are disclosed in the following description, in reference to the attached drawings, which show a preferred embodiment and one variation which are nonlimiting.

FIG. 2 is a vertical cross section through the assembly, along the axial plane.

FIG. 3 is a cross section of a detail from FIG. 2.

FIG. 4 is a partial cross section showing an assembly which is included in this embodiment.

Figure 1:
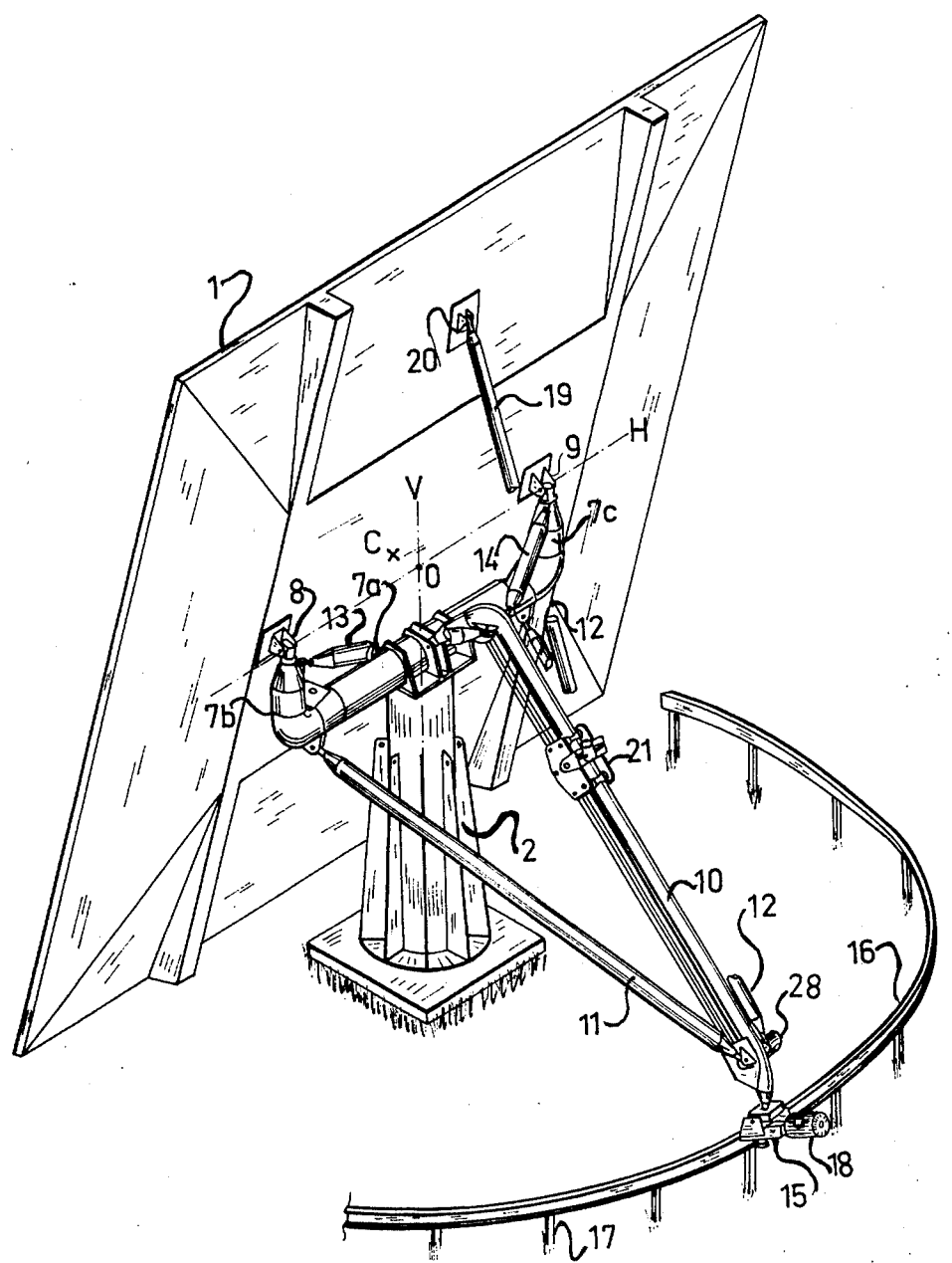
FIG. 1 is a perspective of one embodiment, with partial cross sections through certain elements.

The altazimuth orientation support shown in the drawings provides that a flat panel 1 can pivot for orientation in azimuth and in angle, so that the reflected beam reaches a stationary objective whatever the position of the sun.

This support includes a hollow column 2, comprising a steel reinforced sheath, bolted down on a concrete mass. The column is essentially vertical, without extremely precise adjustment of its verticality.

As seen in FIGS. 2 and 3, this column has a spherical bearing 3 at the top, on which rests a convex part 4 of ball head of conjugate spherical form. This ball head part is fastened to a pivot 5 which penetrates into hollow column 3. This pivot is thus sustained by the column by the interposition of bearing 3, and its verticality can be regulated precisely by regulation means 6 which permit adjustment of the position of the base of said pivot. The regulation means can include three tightening rings around pivot member 5, spaced angularly at 120°, which also engage on the wall of the sheath by external bolts to allow for variation of the used length and thusly the verticality of pivot 5.

It is to be noted that for control of the movements of the panel in open loop, the verticality of the pivot along axis V must be precisely regulated, because the movements are generated by taking absolute spatial references, by determining relative to these references the trajectory of the sun, and by deducing from that the absolute rotations to execute. On the contrary, if the control is assured in closed loop, this verticality does not have to be regulated so precisely, since the corrections do not refer to absolute axes, but are adjusted by successive advances while referring to the variations of orientation of a reflected ray collected by a sighting element.

Besides, pivot 5 is integral with a tubular mounting 7 which includes a horizontal portion 7a connected in the middle to the pivot, and two upward angled ends 7b and 7c. Each end is provided with an articulation joint 8 or 9, which carries panel 1 with interposition of caps. These ends are adapted such that the articulations 8 and 9 define a horizontal axis H of panel rotation, intersecting with vertical axis V. The movements of the panel are effected around the intersection point 0 of these two axes. The center C of the panel is near this point, since it is moved away only by a distance formed by the thickness of the panel.

Thus, the orientation support according to the invention lends itself to control in closed loop, because the sighting element can be positioned without difficulty to receive the rays reflected by the central zone of the panel which is displaced on a small diameter sphere.

The mounting 7 is rigidly connected to a framework for maneuvering in azimuth, formed in the example by five tubular elements: one rear axial element 10, two rear lateral elements 11 and 12, and two anterior lateral elements 13 and 14. In FIG. 1, these elements are arranged according to the sides of a trihedon, in such a fashion as to form a rigid indeformable structure. They are connected by their anterior parts to mounting 7 in such a manner that the assembly constituted of the mounting and this structure is of itself an indeformable rigid assembly. The connections are assured on the set off axes, and the axial element 10 includes an angled anterior portion which assures its connection with the mounting.

The rear end of axial element 10 is connection system which will be described hereinafter, to a carriage 15 which is adapted to be moved along a circular rail 16; this rail is anchored on the ground by means of small posts 17 and is centered (i.e., has its center of curvature) on the V axis. It has a transverse section in U form. Carriage 15 can be drawn along rail 16 by drawing means described hereinafter, including a direct drive motor 18. The position of carriage 15 along the rail defines the position of the framework for maneuvering in azimuth 10, 11, 12, 13, 14 around the axis V, and thus that of mounting 7 and consequently, the azimuth angle of the panel.

Also, the orientation support includes a tubular rod 19, situated in the vertical axial plane of the panel and connected to it at the top by an articulation 20. The foot of this rod is movable along axial element 10 and is for this purpose articulated on a carriage 21 which is guided by this element.

Figure 5:
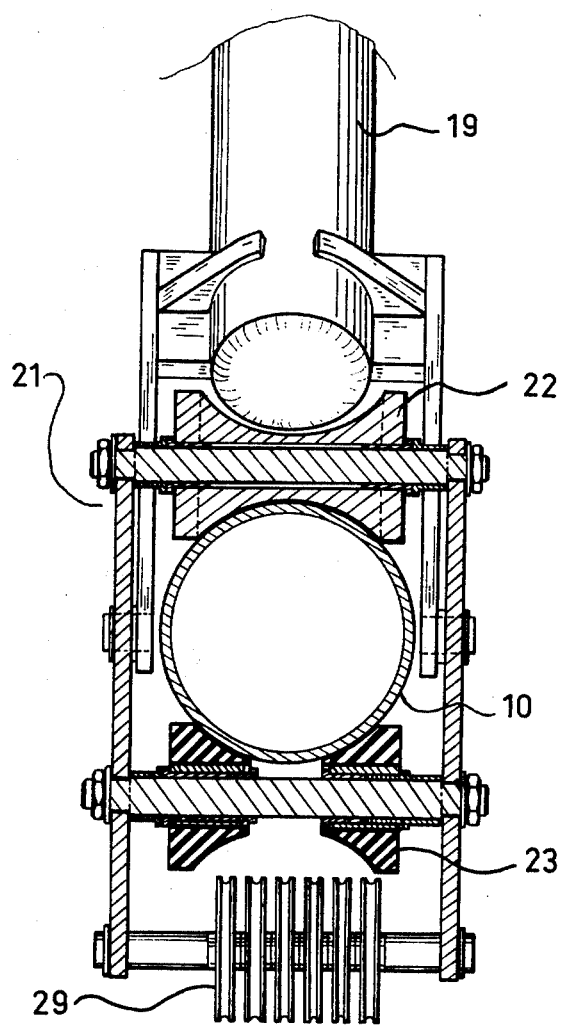
FIG. 5 is a cross section showing a detail of this embodiment.
Figure 6:
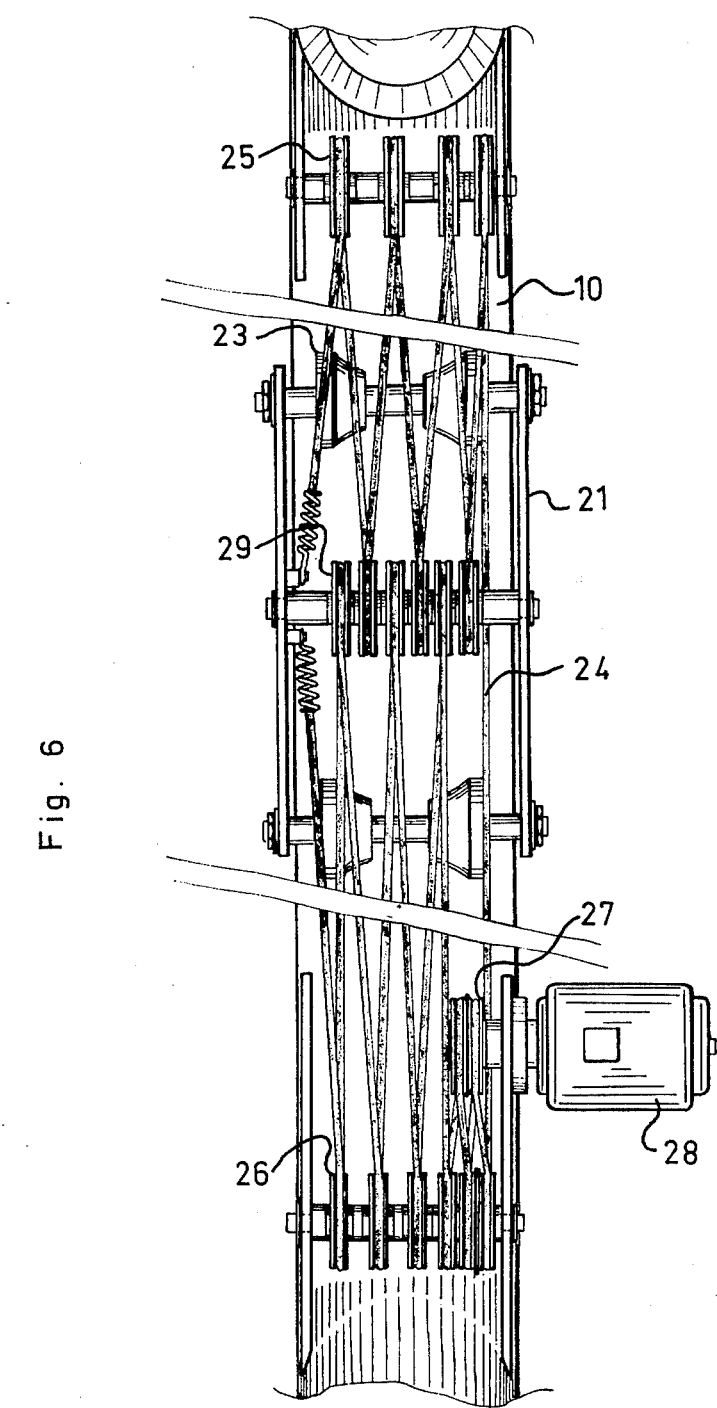
FIG. 6 is a view from the bottom in the direction of axis V of this embodiment.

FIGS. 4 and 5 show this carriage including four partially cylindrical grooved runners, 22 and 23; the top runners 22 are steel and precisely define the position of the carriage along element 10, while the bottom runners 23 are coated with an elastic layer which takes up the play and assures constant engagement of the top runners on element 10.

Carriage 21 can be moved along element 10 by a double pulley system extending along this element. This system includes a cable 24 which effects several cycles around between two tackles 25 and 26 articulated on element 10; the strands of the cable are wound at the bottom part on a winch 27 driven by a direct drive motor 28. These strands are wound on the one hand on loose pulleys 29 which are integral with the carriage, and the ends of the cable are hooked to this to assure its being pulled. This pulley system with several strands permits reduction of the torque which has been developed by the motor, and is to increase the precision with which carrage 21 is positioned along element 10, due to the reduction effect. Thus, high precision angle regulation is obtained with low cost elements.

Figure 7:
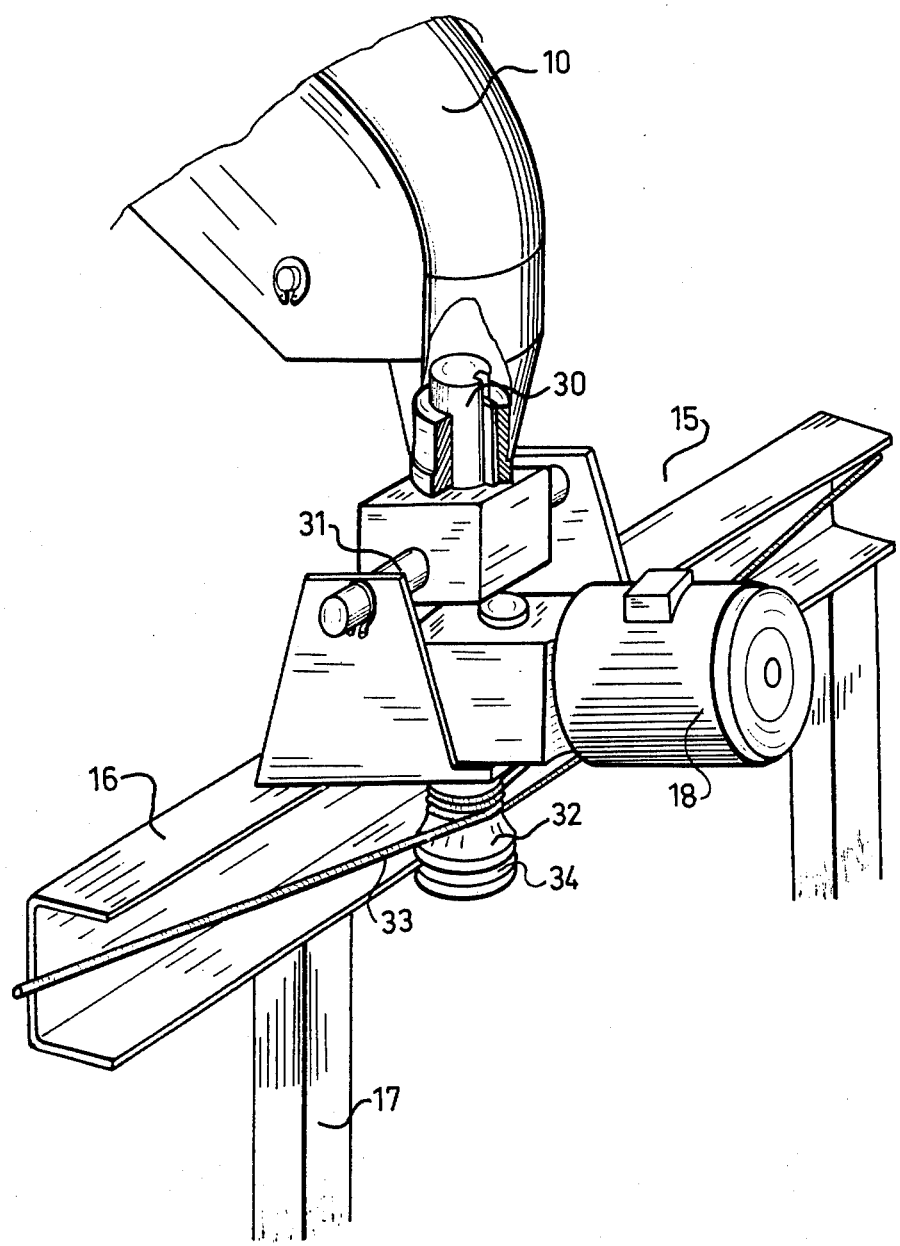
FIG. 7 is a partial perspective view of a different assembly.

Also, FIG. 7 shows an embodiment of carriage 15, with means to pull it along rail 16, and the connection system by which this carriage is connected to axial element 10.

This connection system confers a freedom of clearance in the radial plane, perpendicular to the direction of rail 16; it comprises an essentially vertical slide element 30 to permit essentially vertical clearance (in the example, a vertical axis keyed into a bearing which is integral with element 10), and a journal 31 parallel to the tangential direction of the rail to permit pivot in the perpendicular plane in this direction. This system is thus adapted to absorb the variations of radius of curve of the rail or variations of height of the rail. Of course, these variations are slight, and the degree of play acceptable is on the order of few millimeters.

In FIG. 7, the direct drive motor is prepared to cause a winch 32 to rotate, around which is wound cable 33, extending along the rail; this cable is guided by the rail and applies winch 32 against one wing of the rail along which it can roll because of a groove 34 in the winch. In such a system, the carriage is guided by the rail in the course of its displacement, but it is cable 33 and not the rail which directly defines the azimuth angle: sliding along the rail remains without influence on the degree of this angle.

Figure 8:
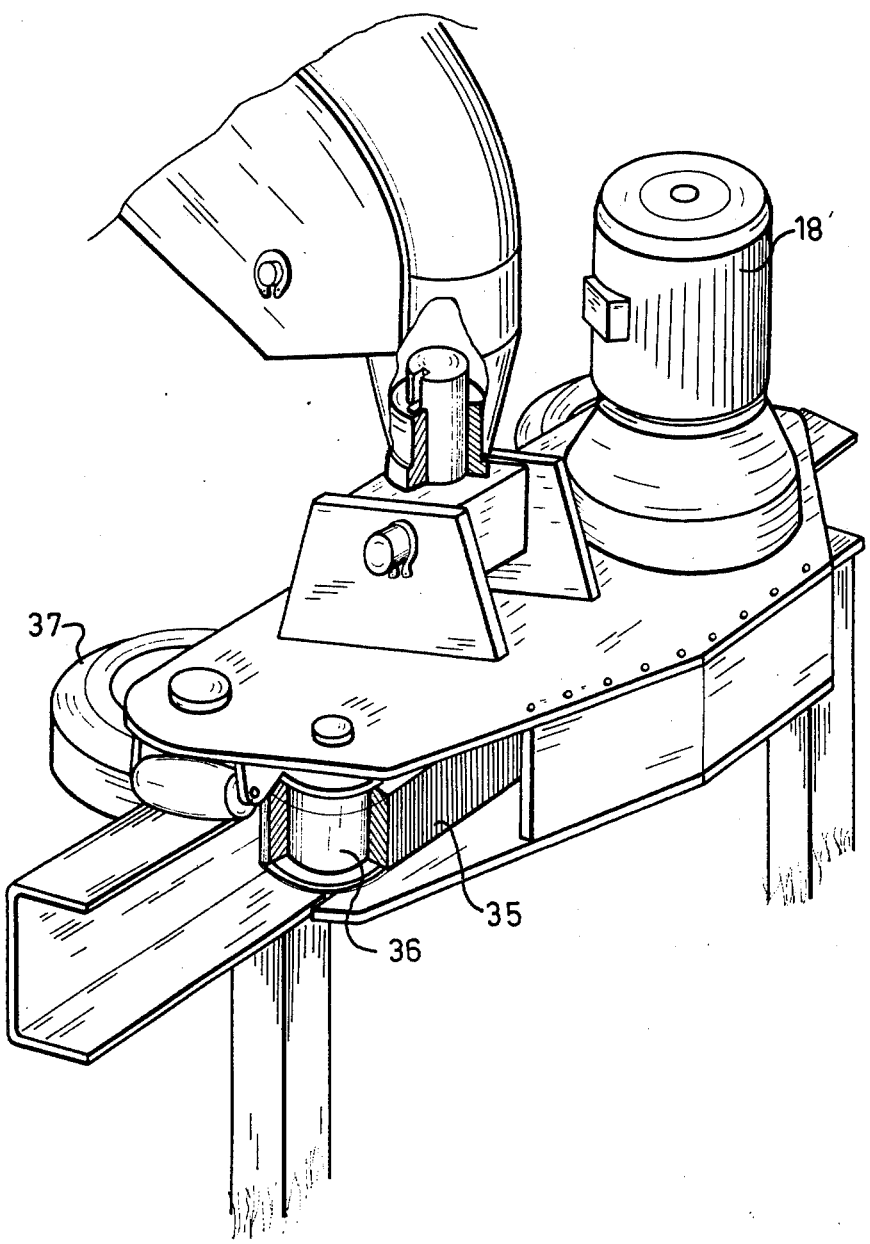
FIG. 8 is a partial perspective view showing a variation of this assembly.

FIG. 8 shows another embodiment of pulling means for the carriage. Here it is moved by a friction system engaging against the rail and adapted to roll without sliding along the rail; this system is caused to rotate by a direct drive motor 18'. This system here includes a serrated belt 35 extending between two pulleys 36 of which one is moved by the direct drive motor. Pressure runners 37 apply the belt against the rail.

The orientation support structure disclosed permits, on the one hand, definition with great precision of the aximuth angle and the elevation angle which characterize the orientation of the panel by a decentralized drive of the panel, and on the other hand, reduction of the necessary motive power; the direct drive motors used can be direct drive motors of present quality available at reduced cost on the market. The different elements, particularly the circular rail, can be manufactured with customary tolerances and assembled without particular precautions.

Of course the invention is not limited to the terms of the preceding description, but includes also all of the variations.

What is claimed is:

1. An altazimuth orientation support for permitting orientation of a panel in elevation and in azimuth comprising a substantially vertical pivot, a stationary central column having support means for said pivot and adapted to guide said pivot in rotation about a vertical axis, a mount integral with said pivot for carrying said panel so that the center of said panel is adjacent said vertical axis, said mount including articulation means between said mount and said panel for enabling said panel to pivot about a horizontal axis, a movable framework for maneuvering said panel in azimuth extending rearwardly from said panel and being rigidly fastened on said mount for defining the panel orientation about said vertical axis, means for guiding the rear end of said framework on a circular trajectory centered on said vertical axis, means for driving the rear end of said framework along said guiding means, frame means associated at one end with said articulation means and having at its other end a foot movable along said framework for maneuvering in elevation, and means for driving said foot along said framework for maneuvering said panel in elevation.

2. Orientation support as in claim 1, wherein the support means of the column, and the articulation means of the panel of the mounting are equipped so that the vertical axis H, defined by the support means, and the horizontal axis H, defined by these articulation means, are coplanar, and the zone of intersection of these axes is situated in the vicinity of the center of the panel.

3. Orientation support as in claim 1, wherein the framework for maneuvering in azimuth is formed of a rigid structure in the form of a tetrahedron, provided with a long element extending toward the rear in the axial plane of the panel, and the movable foot of said frame means is connected to this long element to be displaced along with it.

4. Orientation support as in claim 1, wherein the guide means of the rear end of the framework for maneuvering in azimuth include a stationary rail of circular form, centered on vertical axis, and roller means carried by this rear end and guided by the rail.

5. Orientation support as in claim 4, wherein the roller means, situated at the rear end of the framework for maneuvering in azimuth, are connected to this framework by a connection system adapted to give said roller means a freedom of movement relative to the framework in the plane perpendicular to the rail and to connect said framework and said roller means rigidly along the direction tangential to the rail.

6. Orientation support as in claim 5, wherein the connection system connecting the end of the framework and its roller means includes an essentially vertical slide element, permitting an essentially vertical clearance of the roller means, and a journal parallel to the tangential direction of the rail, permitting a pivoting of these roller means in the perpendicular plane to this tangential direction.

7. Orientation support as in claim 4, wherein the drive means of the framework for maneuvering in azimuth include a direct drive motor provided to drive a winch in rotation around which is wound a cable, extending along the rail and guided by it.

8. Orientation support as in claim 4, wherein the drive means of the framework for maneuvering in azimuth include a direct drive motor adapted to drive a friction system in rotation coming in contact against the rail and equipped to roll without sliding against it.

9. Orientation support as in claim 1, wherein said frame means is formed by a rod situated in the axial plane of the panel, and the movable foot of the rod includes roller means guided by the framework for maneuvering in azimuth.

10. Orientation support as in claim 9, wherein the drive means of the roller means of the movable foot of the rod include a double pulley system, extending along said frame means, and provided with a cable attached to said rolling means, and said pulley system being equipped to be moved by a winch powered by a direct drive motor on said frame means.

11. Orientation support as in claim 1, wherein the support means include the stationary column including a spherical bearing, fastened to said column and on which rests a convex ball head part of conjugated spherical form, connected to the pivot.

12. Orientation support as in claim 10, wherein the stationary column is a hollow column in which penetrates said pivot, means for regulating the base position of said pivot for adjusting the verticality of said pivot.

* * * * *